Dec. 12, 1967      H. S. BROWN      3,357,751

VEHICLE-TRACK SYSTEM

Filed Jan. 10, 1966

INVENTOR
HARRY S. BROWN
BY Norman N. Popper
ATTORNEY

United States Patent Office 3,357,751
Patented Dec. 12, 1967

3,357,751
VEHICLE-TRACK SYSTEM
Harry S. Brown, 209 Midstreams Road,
Bricktown, N.J. 08723
Filed Jan. 10, 1966, Ser. No. 519,594
7 Claims. (Cl. 305—34)

ABSTRACT OF THE DISCLOSURE

A vehicle track system for vehicles having a plurality of wheels disposed in the same vertical plane on opposite sides of the vehicle; each of the tires of the vehicle has a peripheral, radial slot: a plurality of demountable interconnected retainers are located in each of the radial slots in each tire; the retainers extend outwardly from the slots and into a channel defined on the inner surface of a track (loop) applied to the tires, whereby the track is held by the retainers on the tires and cannot be thrown or laterally displaced.

---

The invention relates to vehicle-track systems for all-terrain vehicles generally, and particularly to a vehicle-track system which may be mounted and demounted readily.

It is among the objects of the invention:

(1) to provide a vehicle-track system which may be applied to an all-terrain vehicle;

(2) to provide a vehicle-track system which is pneumatically held upon the tires of an all-terrain vehicle, and will not be thrown or discharged therefrom;

(3) to provide a vehicle-track system which is resistant to heavy stress under difficult terrain conditions and will not slip;

(4) to provide a vehicle-track system which is additive to a vehicle and may be readily applied or removed.

These objects and advantages as well as other objects and advantages may be attained by the device shown by way of illustration in the drawings in which.

Figure 1:
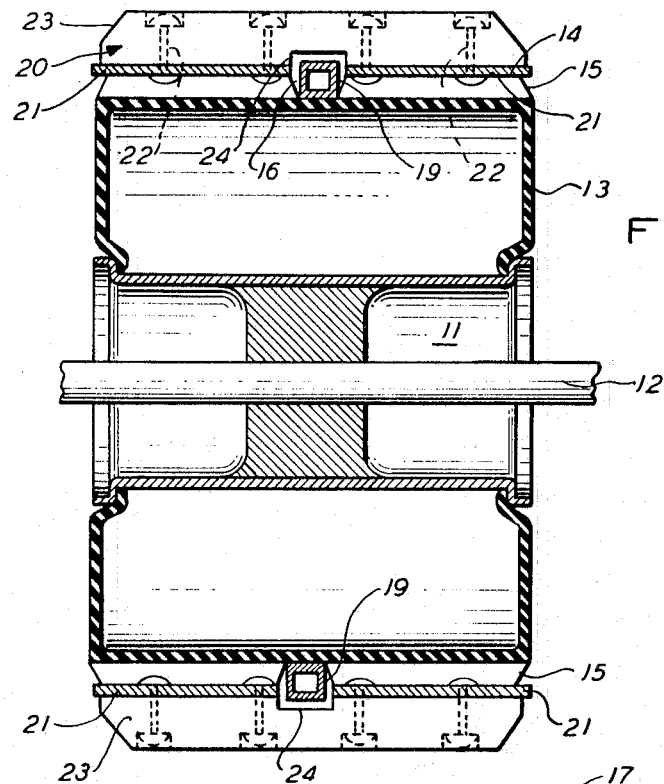
FIGURE 1 is a vertical sectional view of a wheel for an all-terrain vehicle to which wheel the vehicle-track has been applied.
Figure 2:
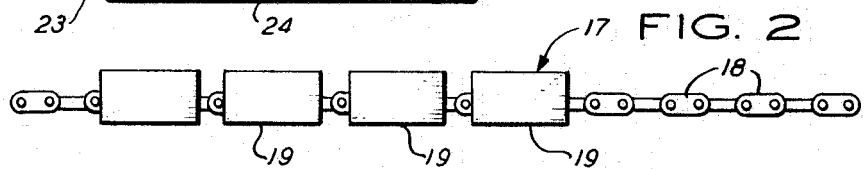
FIGURE 2 is a side elevational view of a guide assembly for the vehicle-track system.
Figure 3:
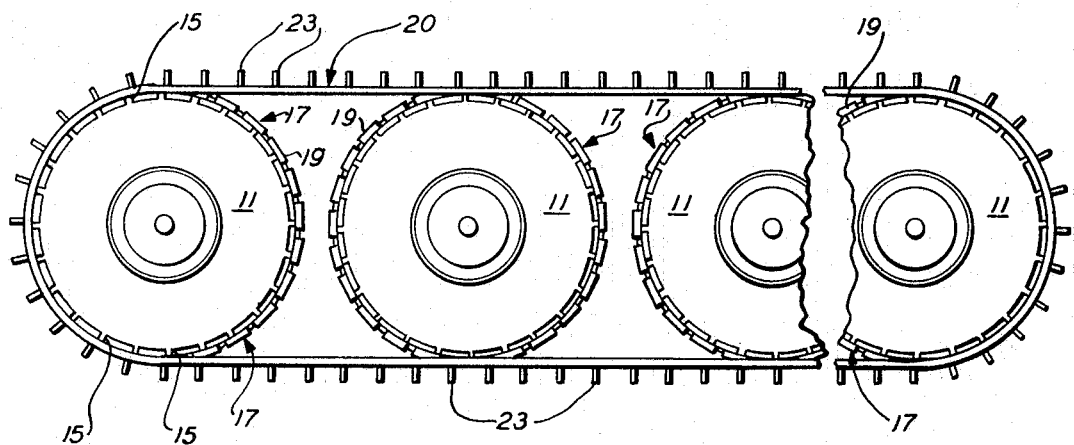
FIGURE 3 is a side elevational view of the wheels of an all-terrain vehicle to which the vehicle-track system has been applied.

With the expansion of population, the utilization of difficult territories and land expanses which had formerly been disregarded, are now being resorted to, making it necessary and desirable to have a vehicle which can traverse steep slopes, swampy or boggy land, areas frequently covered with snow, ice or slush and marginal lands which are semi-submerged. Various vehicles have been devised to accomplish this purpose. Demountable tracks are sometimes applied to those multi-wheeled vehicles, but under stress, the tracks are often thrown or discharged from the wheels. The present track system is intended to resist discharge from the wheels of the vehicle during use.

Referring now to the drawings in detail, there is shown a pertinent portion of a universal vehicle provided with wheels 11 each mounted on an axle 12. Pneumatic tires 13 are mounted on each wheel. The peripheral surface 14 of each tire 13 is generally transversely flat, and is provided with a plurality of transverse cleats 15, which may be coaxially or angularly disposed with respect to the axle 12. Each cleat 15 is divided into two substantially equal parts by a central groove or channel 16, defining an interrupted, discontinuous channel extending annularly around the peripheral surface of the tire 13 through the cleats 15. The channels 16 define a retaining means or seat for a guide assembly 17. The guide assembly 17 may consist of a continuous chain loop 18, seated in the channels 16, upon which loop 18, at suitably spaced intervals, there are mounted generally rectangular blocks 19. Each guide assembly 17 is of sufficient length, that when the tire 13 is partially deflated, it may be slipped over the tire, and positioned in the channel 16. When the tire 13 is then reinflated, and expands diametrically, the guide assembly 17 will be snugly seated in the channel 16 with sufficient tightness that it cannot axially move out of the channel. The blocks or retainers 19 are sufficiently high so that when the guide assembly 17 is firmly seated in the channel 16, the blocks will extend above the channel. A track 20, which is a continuous, endless loop is provided. The track 20 is formed of a pair of bands 21, 21, preferably of high tensile strength ribbon steel. Attached to the bands 21 by bolts 22 or rivets, or other suitable means, there are a plurality of transverse cleats 23. The bands 21, 21 are held sufficiently spaced apart from each other by the cleats 23, so that they may receive between them, the blocks 19 when the track 20 is applied to the tire 13. Each of the cleats 23 is provided with an inside central cut-out portion or channel 24, so that the blocks 19 may be received between the bands 21, 21, and thereby hold the bands 21, 21 centered on the tires 13. The track 20 is applied to the partially deflated tires 13 at the same time that the guide assembly is applied so that once the guide assembly 17 is in place, the continuous track 20 is also slipped into place. The track 20, however, embraces a plurality of wheels 11 while the guide assemblies 17 are each merely fitted individually to each wheel 11. With the guide assemblies 17, and the track 20 in place, the tires 13 are reinflated. Each guide assembly 17, with the distended tire 13, will function as a retainer between the bands 21, 21 of the track 20, and hold them centered on the wheels 11, thereby preventing the track 20 from being thrown during the stress of power operation.

While I have shown the guide assembly 17 to consist of a link chain with retainer blocks mounted thereon, this merely constitutes the preferred embodiment, for any flexible annulus such as a cable, or a continuously molded loop with enlargements thereon, could be substituted.

While I have referred to the loops 21, 21 as steel bands, other materials could be substituted, and the track 20 could be made as a continuously-molded, unitary, flexible track of toughened rubber. It is also to be understood that the cleats 23 which have been generally shown (in FIGURE III) to be transverse, can be disposed angularly. The construction shown merely represents a preferred embodiment of the invention. The construction shown presents a readily demountable track 20, which is strongly held attached to a plurality of wheels for traversing difficult terrain. For normal surfaces presenting no problems of sinking, skidding or the like, the tires 13 may be partially deflated and the continuous loop track 20 removed along with the guide assembly 17. The vehicle is then operated normally on its individual wheels 11, 11, etc.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:

1. A vehicle track system comprising:
 (a) a plurality of vehicle wheels disposed in the same general vertical plane;
 (b) an inflatable tire on each wheel;

(c) a peripheral, annular substantially centrally disposed channel in each tire;
(d) a plurality of retainers in each channel, with peripheral edges extending radially out of the channels;
(e) means attaching together the retainers in each channels in continuous separate loops on each tire and holding them seated in each channel to define guide assemblies on each tire for keeping a track centered on the tires;
(f) a pair of flexible loops defining said track positioned on and driven by a portion of the periphery of the tires, said track loops being slightly spaced apart so as to position one loop on each side of but closely adjacent to the guide assemblies, and having an internal channel with loop circumference greater than the length of a line defined by the peripheral edges of the retainers;
(g) a plurality of cleats, each connected to both loops and extending radially, and outwardly therefrom.

2. A vehicle track system comprising:
(a) the device according to claim 1, and
(b) the channels on the tires intersecting with transverse slots in the tires defining cleats.

3. A vehicle track system comprising:
(a) the device according to claim 1, and
(b) the loops holding the tracks in straddling relation with the retainers and against discharge during driving operation.

4. A vehicle track system comprising:
(a) the device according to claim 1, and
(b) the tires inflatable sufficiently to hold the guide assemblies each firmly seated against discharge from the radial, central channel.

5. A vehicle track system comprising:
(a) the device according to claim 1, and
(b) the tires inflatable sufficiently to position the guide assemblies between the loops.

6. A vehicle track system comprising:
(a) the device according to claim 1, and
(b) the tires inflatable sufficiently to position the loops taut on either side of the guide assemblies, and on the tires.

7. A vehicle track system comprising:
(a) the device according to claim 1, and
(b) the channels on the tires intersecting with transverse peripheral slots in the tires defining cleats;
(c) the loops holding the tracks in straddling relation with the retainers and against discharge driving operation;
(d) the tires inflatable sufficiently to hold the guide assemblies each firmly seated against discharge from the radial central channel;
(e) the tires inflatable sufficiently to position the guide assemblies between the loops;
(f) the tires inflatable sufficiently to position the loops taut on either side of the guide assemblies, and on the tires.

References Cited

UNITED STATES PATENTS

| | | |
|---|---|---|
| 2,770,977 | 11/1956 | Beckadolph. |
| 2,898,965 | 8/1959 | Eddy _____ 305—35 X |
| 2,992,863 | 7/1961 | Fredricks _____ 305—34 X |
| 3,107,128 | 10/1963 | Ruane _____ 305—35 |
| 3,183,987 | 5/1965 | Trombley _____ 305—35 X |

FOREIGN PATENTS

| | | |
|---|---|---|
| 299,158 | 10/1928 | Great Britain. |
| 161,415 | 11/1957 | Sweden. |

RICHARD J. JOHNSON, *Primary Examiner.*